Figure 1:
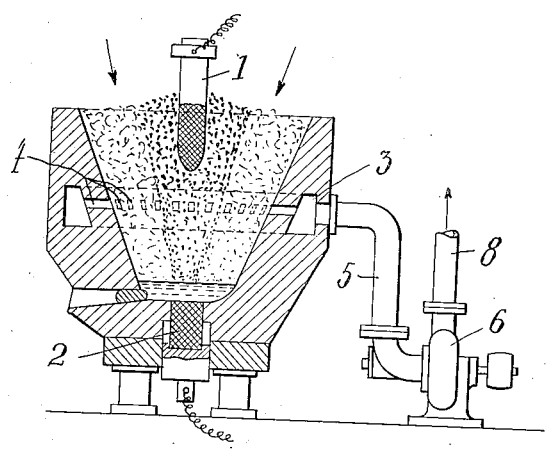

No. 858,623.

PATENTED JULY 2, 1907.

A. J. PETERSSON.
PROCESS OF CONTINUOUSLY PRODUCING CARBID FROM LIME AND CARBON.
APPLICATION FILED OCT. 30, 1906.

Witnesses.

Inventor.
Albert Johan Petersson,
by Henry Orth Jr.
Atty

UNITED STATES PATENT OFFICE.

ALBERT JOHAN PETERSSON, OF ALBY, SWEDEN.

PROCESS OF CONTINUOUSLY PRODUCING CARBID FROM LIME AND CARBON.

No. 858,623.  Specification of Letters Patent.  Patented July 2, 1907.

Application filed October 30, 1906. Serial No. 341,345.

*To all whom it may concern:*

Be it known that I, ALBERT JOHAN PETERSSON, a subject of the King of Sweden, and a resident of Alby, Sweden, have invented certain new and useful Improvements in Processes of Continuously Producing Carbid from Lime and Carbon; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a process for continuously producing carbid from lime and carbon, by which it is possible to obtain a higher efficiency from the electric current than heretofore. In the reaction between lime and carbon it is well known, that besides carbid, large quantities of carbonic oxid is formed which in the usual processes have been led off without being utilized or at the most have been accumulated and utilized outside the furnace.

The invention consists, principally, in charging the furnace with carbon and the lime in such a manner as to form separate columns or layers by the side of each other, leading an electric current through the layer or layers of carbon, and burning combustible gases for preheating the lime before the latter comes into the reaction zone of the furnace.

The said process forms a simple and effective manner for utilizing the carbonic oxid formed in the production of carbid, it being only necessary to arrange the furnace in such a manner that the gases of carbonic oxid flow off through the layer of lime and to introduce a suitable quantity of air for burning the carbonic oxid into carbonic acid.

In the processes for producing carbid heretofore known it has not been possible to carry out such a combustion of the carbonic oxid in the charge, in as much as the lime and the carbon have been uniformly mixed with each other and the introduction of air would have caused the burning also of a part of the carbon, and on account thereof it would have been impossible to determine correctly the proportions between the carbon and the lime of the charge. The present invention is free from such a difficulty, in as much as it is possible when charging the carbon and the lime in separate layers to force or draw air through the layers of lime for burning the gases of carbonic oxid passing therethrough or other combustible gases fed into the furnace, while the layer or layers of carbon may be kept so compact that neither the carbonic oxid nor the air will in any essential degree take their way therethrough.

In the accompanying drawing I have shown two furnaces for carrying out the process.

Figure 2:
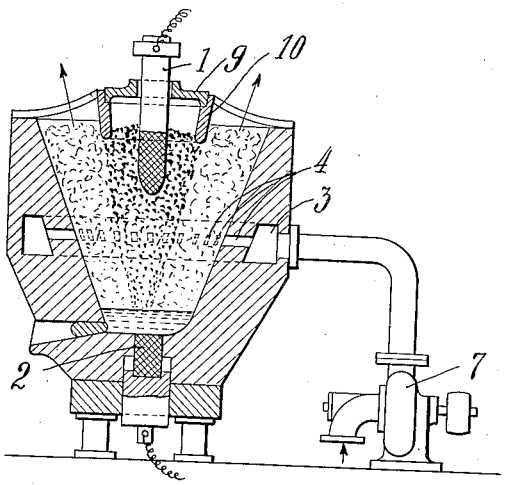

Figures 1 and 2 show diagrammatically each a furnace in vertical section.

Referring to Fig. 1, the furnace in well known manner is provided with a central upper carbon electrode 1 and a lower electrode 2. The charge is introduced successively in such a manner that the carbon will form a column around the upper electrode 1, the said column extending toward the lower electrode, while the lime is charged between the column of carbon and the walls of the furnace. Hereby the electric current will be consumed, chiefly, in the column of carbon and heat the same to such a temperature that reaction takes place between the carbon and the lime at the point of contact in the inner parts of the charge, thereby forming carbid, which melts and accumulates on the bottom of the furnace, and carbonic oxid which tends to flow off through the charge. The furnace is provided with devices for forcing air into the charge and the said devices may, as is shown in the drawing, consist of an annular channel 3 provided in the wall of the furnace and having a number of openings 4 communicating with the interior of the furnace, said channel 3 being connected by means of a pipe 5 with a suction fan 6, Fig. 1, or a force fan 7 Fig. 2.

In the furnace shown in Fig. 1 air will be drawn down through the column of lime, coming into contact with the gases of carbonic oxid formed during the formation of carbid, and said gases are drawn toward the openings 4. The carbonic oxid will be burned and develop an intense heat in the outer parts of the lime layers whereby the same will be intensely preheated before reaching the reaction zone of the furnace.

In the furnace shown in Fig. 2 air is forced in through the openings 4 and mixes with the carbonic oxid flowing upward and burn the latter whereby an intense heat will be developed in the outer parts of the lime layers so that the carbonic oxid will be intensely preheated before reaching the reaction zone of the furnace.

In the furnace shown in Fig. 1 the combustion gases will flow off through the outlet 8 in the casing of the fan 6, while the gases in the furnace shown in Fig. 2 will flow off from the upper surface of the lime layer, as indicated by arrows in the drawing. In both cases the carbon charge is supposed to be so compact that the gases cannot in any essential degree take their way through the same. Eventually the carbon charge may be protected against the gases by being covered at the top by means of a cover 9, as is indicated in Fig. 2 at the hopper 10.

In as much as according to theoretic calculation about 0,4 kilogram of carbonic oxid is formed for each kilogram of calcium-oxid of the charge, it will be easily understood that, by burning the carbonic oxid in the lime charge, great quantities of heat will be developed which will be to the favor of the charge and thereby improve the economy of the process.

As mentioned above the invention is not limited to the burning of carbonic oxid, in as much as other combustible gases may be introduced into the furnace, if desired.

Having now particularly described my invention, what I claim as new and desire to secure by Letters Patent is:

1. The process of continuously producing carbid in an electric furnace, which consists in successively charging carbon and lime into the furnace unmixed with each other in such a manner that they form separate upright columns in close contact with each other, leading an electric current through the column of carbon for heating the same to a temperature sufficient for forming carbid with the lime and burning the combustible gases formed during the reaction in the column of lime for preliminarily heating the same, substantially as and for the purpose set forth.

2. The process of continuously producing carbid in an electric furnace, which consists in charging carbon and lime into the furnace unmixed with each other in such manner that they form separate upright columns in close contact with each other, leading an electric current through the column of carbon for heating the same to a temperature sufficient for forming carbid with the lime, removing the combustible gases formed during the reaction through the column of lime, and introducing air into the column of lime for burning the combustible gases for preliminarily heating the lime charge, substantially as and for the purpose set forth.

In testimony that I claim the foregoing as my invention, I have signed my name in presence of two subscribing witnesses.

ALBERT JOHAN PETERSSON.

Witnesses:
CARL FRIBERG,
EWALD DELMAR.